United States Patent [19]
Tsai

[11] Patent Number: 6,084,230
[45] Date of Patent: Jul. 4, 2000

[54] OPTICAL DEVICE HAVING MULTIPLE LENSES SELECTED TO ACHIEVE OPTIONAL RESOLUTIONS

[75] Inventor: Jenn-Tsair Tsai, Taipei Hsien, Taiwan

[73] Assignee: Mustek Systems Inc., Hsinchu, Taiwan

[21] Appl. No.: 09/100,292

[22] Filed: Jun. 19, 1998

[30] Foreign Application Priority Data

Jun. 26, 1997 [TW] Taiwan ................................ 86210595

[51] Int. Cl.⁷ .............................. H01L 27/00; H04N 1/04
[52] U.S. Cl. ....................... 250/208.1; 358/474; 358/497
[58] Field of Search ................................ 250/208.1, 234, 250/235, 236; 358/296, 450, 451, 474, 482, 483, 497

[56] References Cited

U.S. PATENT DOCUMENTS 5,907,411  5/1999  Han ...................................... 250/208.1

FOREIGN PATENT DOCUMENTS

| | | |
|---|---|---|
| 232398 | 10/1994 | Taiwan . |
| 235112 | 11/1994 | Taiwan . |
| 280480 | 7/1996 | Taiwan . |
| 281851 | 7/1996 | Taiwan . |
| 286850 | 9/1996 | Taiwan . |

*Primary Examiner*—Seungsook Ham
*Assistant Examiner*—Kevin Pyo
*Attorney, Agent, or Firm*—Jenkens & Gilchrist, P.C.

[57] ABSTRACT

An optical device with optional resolutions is provided for converting an image into electronic signals. The optical device includes a housing, a plurality of focusing units with various magnifying powers and various optical path lengths mounted immobily in the housing for variously proportionally receiving the image and generating a focused image, a photoelectric conversion unit mounted immobily in the housing for converting the focused image into electronic signals, a selecting unit for having one of the focusing units selected according to the desired resolution, and a light-reflecting unit mounted immobily in the housing and between the photoelectric conversion unit and the focusing units for transmitting the focused image from the selected focusing unit to the photoelectric conversion unit.

20 Claims, 5 Drawing Sheets

Fig. 6

OPTICAL DEVICE HAVING MULTIPLE LENSES SELECTED TO ACHIEVE OPTIONAL RESOLUTIONS

FIELD OF THE INVENTION

The present invention is related to an optical device, and more particularly to an optical device with optional resolutions.

BACKGROUND OF THE INVENTION

Image processing is often heard of in photography or movies. Scanner plays an indispensable role in this technology. Higher resolution is required to obtain more clear images, but the image files also occupy a larger space in the disk. An A4-size image may be converted into a file of few megabytes when it is scanned with resolution of 600 dpi (dot per inch). Sometimes, an image with lower resolution is allowable so the size of the image file can be reduced very much. The required resolution is various according to circumstances. For example, scanning a usual document requires a lower resolution, but scanning a beautiful photograph needs a higher resolution. Accordingly, the conventional scanner with only one resolution is not proper for all kinds of images. The concept of a scanner with many resolutions has been proposed recently. It is conceivable that some additional elements are needed for "switching" among resolutions to achieve this concept.

A driving element is usually adopted to perform the "switching" function. The word "switching" means that some optical elements will be moved, by the driving element, to be on the optical path according to desired resolution of the scanning operation. It is possible but not commercially practicable because any moving action is unfavorable to the precision of the scanner. Precise locations of the optical elements are very important, but once the optical elements are moved, no one can assure that they would be moved to right positions. A slight error in moving the optical element will cause a serious error in the resulting image file. Apparently, to meet the demand of the public, it is necessary to exercise much effort in manufacturing the conventional scanner with many resolutions, but the scanner is of doubtful utility.

Figure 1A:
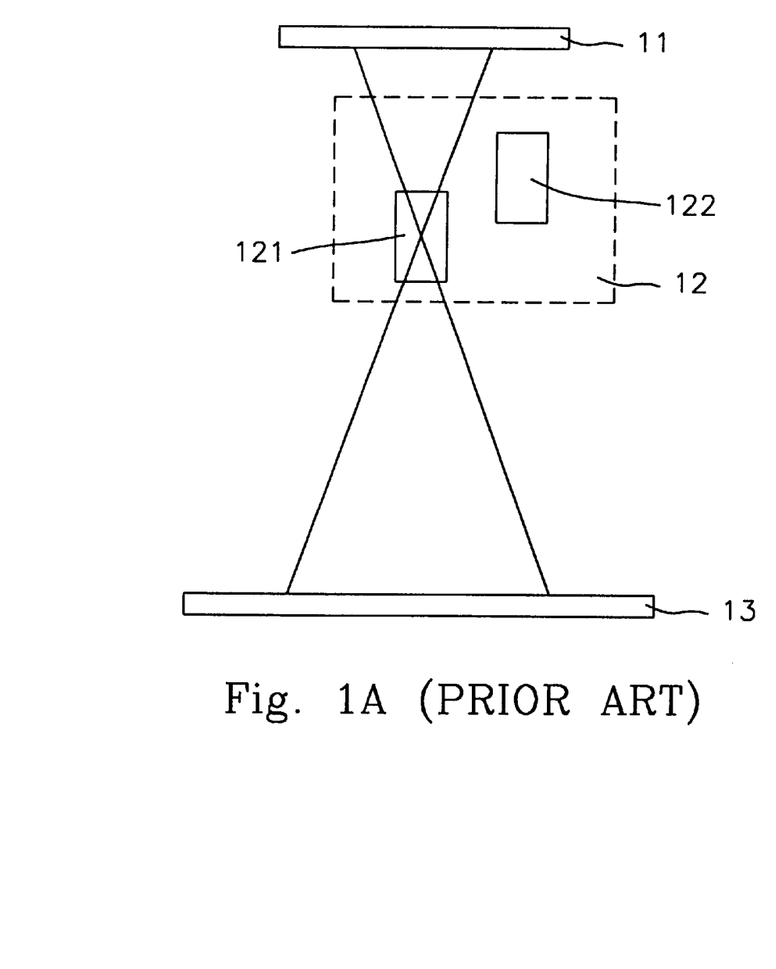
FIGS. 1A–B are schematic diagrams showing how a scanner according to the prior art operates.
Figure 1B:
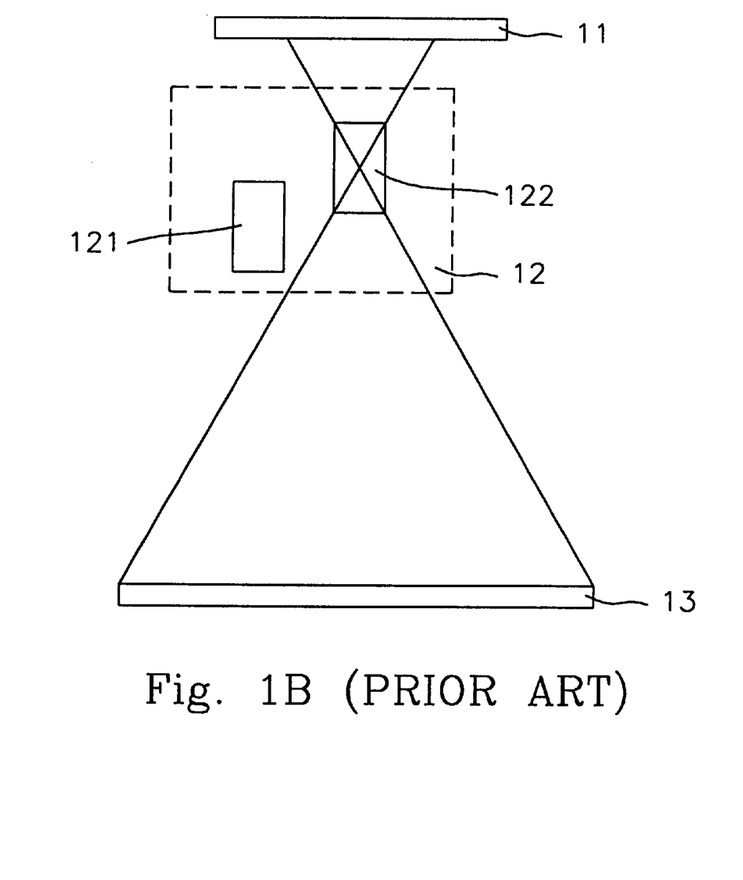

For example, please refer to FIG. 1 which shows how a conventional scanner works. The piece of paper 11 is put on the scanning window and needs to be scanned. If a lower resolution is required, as shown in FIG. 1A, the low-magnifying powered lens 121 of the lens set 12 is moved to be located on the optical path so the charge coupled device 13 receives an image magnified to a smaller size. On the other hand, if a higher resolution is required, as shown in FIG. 1B, the high-magnifying powered lens 122 of the lens set 12 is moved leftwards to be located on the optical path and the charge coupled device 13 receives an image magnified to a larger size. The most serious disadvantage of this method is its unsatisfied precision resulting from moving the lens set 12. The method has further disadvantages. To perform this moving function, additional space is necessary for locating the driving device and for moving the optical elements. It is contrary to the modern machine which is expected to have a minimum size.

There are some Taiwanese Patents showing how to improve such device or method. Taiwanese Patent Publication No. 281851, for instance, provides a method used for scanner, facsimile machine, copy machine, or the like which have optional resolutions. It teaches that both the zoom lens and the charge coupled device are movable wherein they are moved by a driving motor. In order to keep the precision of the machines, a calibrating unit is added. Besides, Taiwanese Patent Publication Nos. 286850 shows that the charge coupled device is moved by a ball screw. Other relevant Taiwanese Patents with Publication No. 232398, 235112, and 280480 teach that lenses are moved by their respective featured driving elements. The advancement of these prior publications would seem as nothing when compared with their large volume, high production cost, and unsatisfied precision.

SUMMARY OF THE INVENTION

An objective of the present invention is to provide an optical device with optional resolutions on the condition that all optical elements are fixed immobily.

In accordance with the present invention, an optical device with optional resolutions for converting an initial image into electronic signals, includes a housing, a plurality of focusing units with various magnifying powers and various optical path lengths mounted immobily in the housing for variously proportionally receiving the initial image through various optical paths to generate a focused image, a photoelectric conversion unit mounted immobily in the housing for converting the focused image into the electronic signals, a selecting unit for having one of the focusing units selected according to the desired resolution in an instance, and a light-reflecting unit mounted immobily in the housing and between the photoelectric conversion unit and the focusing units for transmitting the focused image from the selected focusing unit to the photoelectric conversion unit.

In accordance with another aspect of the present invention, each of the plurality of focusing units is a lens. There are preferably two to four focusing units in the preferred embodiments. The photoelectric conversion unit is preferably a charge coupled device.

In accordance with another aspect of the present invention, the light-reflecting unit preferably includes a plurality of mirrors.

In accordance with another aspect of the present invention, the selecting unit is preferably a light shade set mounted on optical paths of the focusing units. The light shade set may include a movable light shade or a rotatable light shade.

In accordance with another aspect of the present invention, there are a first lens and a second lens in one preferred embodiment. The selected focusing units is the first lens and the second lens in a first instance and in a second instance respectively.

In accordance with another aspect of the present invention, the selecting unit includes a movable light shade. The movable light shade is positioned on the optical path of second lens in the first instance, and the movable light shade is positioned on the optical path of first lens in the second instance.

In accordance with another aspect of the present invention, the selecting unit includes two movable light shades. The first movable light shade is moved away from the optical path of first lens in the first instance, and positioned on the optical path of first lens in the second instance. Similarly, the second movable light shade is positioned on the optical path of second lens in the first instance, and moved away from the optical path of second lens in the second instance.

In accordance with another aspect of the present invention, the light-reflecting device preferably includes a dichroic mirror and a reflective mirror. The dichroic mirror is used for transmitting the focused image from the first lens to the photoelectric conversion unit in the first instance. The reflective mirror is used for transmitting said focused image from the second lens to the photoelectric conversion unit through the dichroic mirror in the second instance. The reflective mirror may be substituted by another dichroic mirror.

In accordance with another aspect of the present invention, the selecting unit preferably includes a rotatable light shade. The rotatable light shade is rotated to be positioned between the dichroic mirror and the reflective mirror (or another dichroic mirror) in the first instance, and to be positioned between the first lens and the dichroic mirror in the second instance.

In accordance with another aspect of the present invention, there are a first lens, a second lens, and a third lens in another preferred embodiment. The selected focusing unit is the first lens, the second lens, and the third lens in a first instance, in a second instance, and in a third instance respectively.

In accordance with another aspect of the present invention, the selecting unit includes three movable light shades. The first movable light shade is moved away from the optical path of first lens in the first instance, and positioned on the optical path of first lens in the second instance and in the third instance. The second movable light shade is moved away from the optical path of second lens in the second instance, and positioned on the optical path of second lens in the first instance and in the third instance. The third movable light shade is moved away from the optical path of third lens in the third instance, and positioned on the optical path of third lens in the first instance and in the second instance.

In accordance with another aspect of the present invention, the light-reflecting device preferably includes two dichroic mirrors and a reflective mirror. The first dichroic mirror is used for transmitting the focused image from the first lens to the photoelectric conversion unit in the first instance. The second dichroic mirror is used for transmitting the focused image from the second lens to the photoelectric conversion unit through the first dichroic mirror in the second instance. The reflective mirror is used for transmitting the focused image from the third lens to the photoelectric conversion unit through the first dichroic mirror and the second dichroic mirror in the third instance. The reflective mirror may be substituted by another dichroic mirror.

In accordance with another aspect of the present invention, the selecting unit further includes two rotatable light shade. The first rotatable light shade is rotated to be positioned between the first dichroic mirror and the second dichroic mirror in the first instance, and to be positioned between the first lens and the first dichroic mirror in the second instance and in the third instance. The second rotatable light shade is rotated to be positioned between the second dichroic mirror and the reflective mirror (or another dichroic mirror) in the second instance, and to be positioned between the second lens and the second dichroic mirror in the third instance.

The present invention may best be understood through the following description with reference to the accompanying drawings, in which:

DETAILED DESCRIPTION OF THE PREFERRED EMBODIMENTS

The present invention will now be described more specifically with reference to the following embodiments. It is to be noted that the following descriptions of the preferred embodiments of this invention are presented herein for the purpose of illustration and description only. It is not intended to be exhaustive or to be limited to the precise form disclosed.

Figure 2:
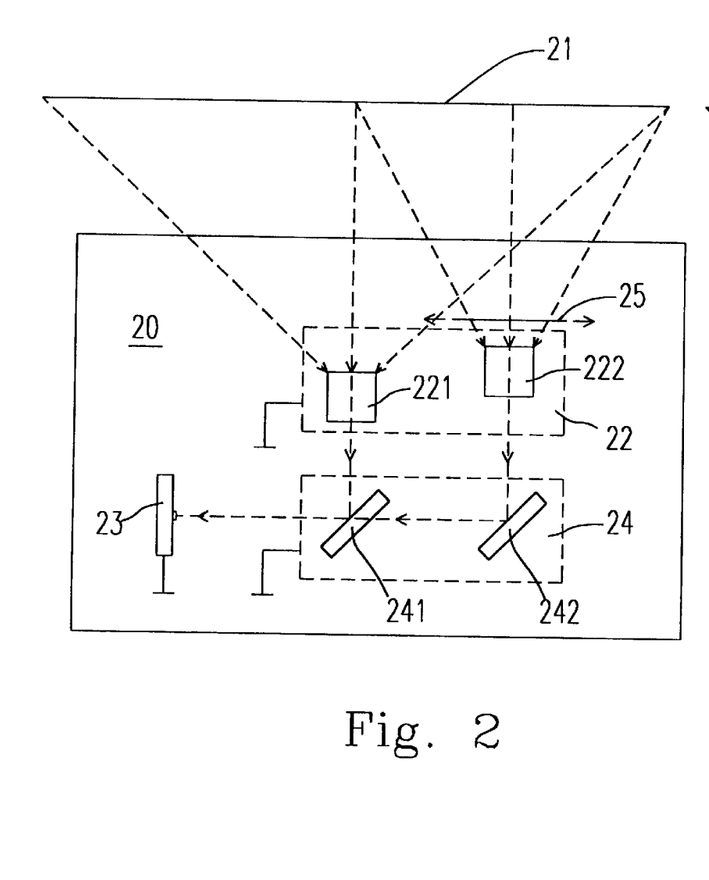
FIG. 2 is a schematic diagram showing a preferred embodiment of a scanner according to the present invention.

Please refer to FIG. 2 which is a schematic diagram showing a preferred embodiment of a scanner according to the present invention. The scanner has a lens set 22 including two lenses 221 and 222 which are mounted in specific locations within the housing 20 of the scanner so the object distance and image distance of lens 221 are different from those of lens 222 according to the lens maker's equation. Hence, the magnifying power, which is defined as the ratio of image distance to object distance, of lens 221 is different from that of lens 222. While using the scanner, user puts a piece of paper in the scanner and an initial image 21 is generated. If a lower resolution is required, the movable light shade 25 is moved to the location on the optical path of initial image 21. Thus, the initial image 21 will be focused by lens 221 to generate a corresponding focused image, but will not be focused by lens 222. A light-reflecting unit 24 is used for transmitting the corresponding focused image to the charge coupled device 23. It is to be noted that the connecting lines between each of lens set 22, the light-reflecting unit 24 and the charge coupled device 23, and the housing 20 are used to schematically indicate that these elements are immobily mounted in the housing 20 of the scanner. The light-reflecting unit 24 includes a dichroic mirror 241 and a reflective mirror 242. The so-called dichroic mirror has different physical properties such as reflectance and transmittance on the opposite sides. In the following embodiments, the dichroic mirror performs as a glass on one side and as a conventional mirror on the other side. In other words, the dichroic mirror can transmit light on the glass-like side and reflect light on the mirror-like side. The generated focused image is transmitted to the charge coupled device 23 by dichroic mirror 241. Then, the charge coupled device 23 converts the corresponding focused image into electronic signals which will be processed later. On the other hand, if a higher resolution is required, the movable light shade 25 is moved leftwards to be located between the initial image 21 and the lens 221. The optical path is obstructed by the movable light shade 25 so the initial image 21 would not be focused by lens 221. The initial image 21 is focused by lens 222 to generate a corresponding focused image. The reflective mirror 242 transmits the generated focused image to the charge coupled device 23 by way of dichroic mirror 241. Thereafter, the charge coupled device 23 converts the corresponding focused image into electronic signals which will be processed later.

Certainly, another dichroic mirror can be used for substituting for the reflective mirror 242. The high performance of the scanner is the same, but a dichroic mirror is more expensive than a reflective mirror.

Figure 3:
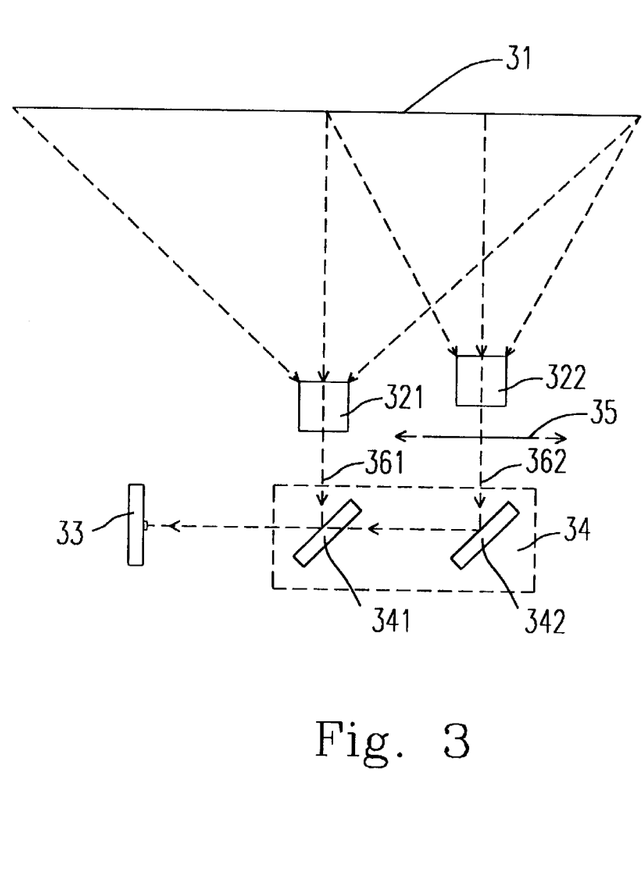
FIG. 3 is a schematic diagram showing another preferred embodiment of a scanner according to the present invention.

Please refer to FIG. 3 which is a schematic diagram showing another preferred embodiment of a scanner according to the present invention. The operating principle of this scanner is similar to that of the preceding embodiment except that the movable light shade 35 is mounted on optical paths 361 and 362 of the corresponding focused image. When a piece of paper is scanned, an initial image 31 is generated. The initial image 31 is focused by both lenses 321 and 322 so two corresponding focused images are generated; one follows optical path 361, and the other follows the other optical path 362. If a lower resolution is allowable, the movable light shade 35 is moved to be located on optical path 362 so the corresponding focused image generated by lens 322 is obstructed, but the other is not. A light-reflecting unit 34 is applied to transmit the corresponding focused image to the charge coupled device 33. The light-reflecting unit 34 includes a dichroic mirror 341 and a reflective mirror 342. The corresponding focused image generated by lens 321 is transmitted to the charge coupled device 33 by dichroic mirror 341 and then to be converted into electronic signals by charge coupled device 33. If a higher resolution is necessary, the movable light shade 35 is moved leftwards to be located on optical path 361 so the corresponding focused image generated by lens 321 can not be transmitted to the charge coupled device 33 through optical path 361. The reflective mirror 342 transmits the corresponding focused image generated by lens 322 to the charge coupled device 33 by way of dichroic mirror 341. Later, the charge coupled device 33 will convert the received corresponding focused image into electronic signals. Certainly, another dichroic mirror can substitute for the reflective mirror 342 with the reason indicated above.

The feature of these two preferred embodiments is that the optical elements such as lenses, light-reflecting unit, and the charge coupled device are immobily mounted in the housing when resolution of the scanner changes. The precision of the scanner is affected closely by the positions of optical elements. A movable light shade is adopted in the preferred embodiments of the present invention to switch the resolution of the scanner by shading the charge coupled device from all the corresponding focused images except the desired one. The precision of the scanner according to the present invention keeps unerring because moving the light shade will not affect the positions of other optical elements. The other driving elements provided due to precision according to the prior arts are not needed so the size and the production cost are reduced very much. Accordingly, the present invention really conforms to the genius of modern technology.

Figure 4:
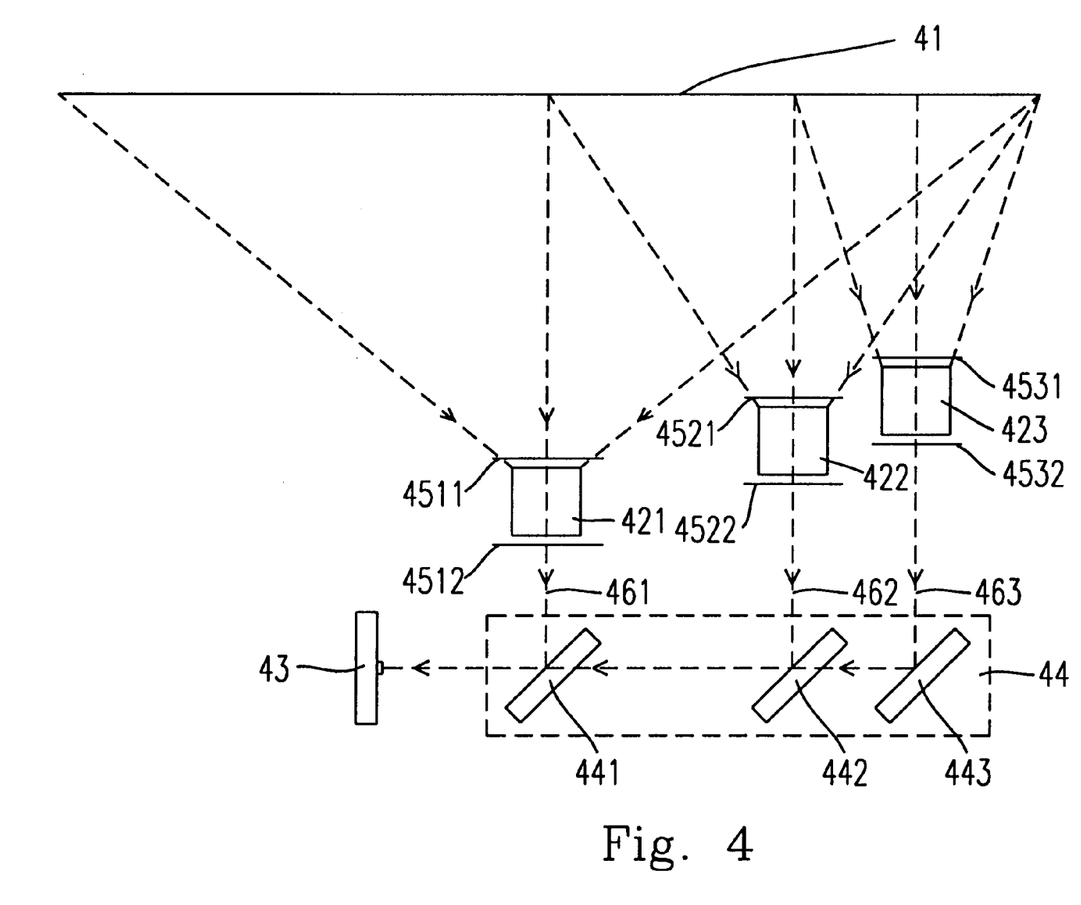
FIG. 4 is a schematic diagram showing a third preferred embodiment of a scanner according to the present invention.

The number of focusing units can be expanded to meet one's requirement. Their working functions are similar to the ones stated above. Please refer to FIG. 4 which is a schematic diagram showing a third preferred embodiment of a scanner having three focusing units according to the present invention. Each lens is accompanied by only one movable light shade. In other words, only one of the movable light shades 4511 and 4512 is adopted to match lens 421 in the scanner. By the same token, only one of the movable light shades 4521 and 4522, and only one of the movable light shades 4531 and 4532 are needed. All possible movable light shades shown in the diagram are not essential. They are shown in order to indicate all the possibilities. If a lower resolution is allowable, the movable light shades 4511 and 4512 belonging to lens 421 are dislodged from their positions while the other movable light shades keep provided at their original positions so optical paths 462 and 463 of undesired corresponding focused images are obstructed. The initial image 41 is then focused by lens 421 and a corresponding focused image is generated. A light-reflecting unit 44 is used for transmitting the corresponding focused image to the charge coupled device 43. The light-reflecting unit 44 includes two dichroic mirrors 441 and 442 and a reflective mirror 443. The reflective mirror 443 can be displaced by a third dichroic mirror. The corresponding focused image generated by lens 421 is transmitted to the charge coupled device 43 through optical path 461 by dichroic mirror 441. At last, the charge coupled device 43 converts the corresponding focused image into electronic signals. Likewise, if a higher resolution is required, the movable light shades 4521 and 4522 are dislodged while the other movable light shades keep placed at their original positions to obstruct optical paths 461 and 463. Then, the initial image 41 is focused by lens 422 and a desired corresponding focused image is generated. The dichroic mirror 442 transmits the desired corresponding focused image to the charge coupled device 43, and the focused image is converted into electronic signals through optical path 462 and by way of dichroic mirror 441. Similarly, if the highest resolution is necessary, the movable light shades 4531 and 4532 are dislodged while other movable light shades keep placed at their original positions to obstruct optical paths 461 and 462. The initial image 41 is focused by lens 423 and a corresponding focused image is generated. The desired corresponding focused image is transmitted to the charge coupled device 43 by reflective mirror 443 through optical path 463 and by way of dichroic mirrors 442 and 441 in sequence, and is converted into electronic signals.

In stead of movable light shade, a rotatable light shade can perform well, too. Please refer to FIG. 5 which is a schematic diagram showing a fourth preferred embodiment of a scanner according to the present invention. The scanner has two focusing units 521 and 522 which are mounted in specific locations so their magnifying powers are different. The initial image 51 is focused by both lenses 521 and 522 so two corresponding focused images are generated; one follows optical path 561, and the other follows the other optical path 562. While scanning a normal document, a lower resolution is allowable. The rotatable light shade 55 rotates and is located between the dichroic mirror 541 and the reflective mirror 542 which constitute the light-reflecting unit 54. The dichroic mirror 541 transmits the corresponding focused image generated by lens 521 to the charge coupled device 53. The charge coupled device 53 then converts the corresponding focused image into electronic signals which may be processed by a computer or other image processing machines later. Regarding to the corresponding focused image generated by lens 522, it is obstructed by the rotatable light shade 55 so it can not reach the charge coupled device 53. On the other hand, while scanning a beautiful colour photograph, a higher resolution is necessary. The rotatable light shade 55 rotates and is located on optical path 561. The reflective mirror 542 transmits the corresponding focused image generated by lens 522 to the charge coupled device 53 by way of dichroic mirror 541. The charge coupled device 53 then converts the corresponding focused image into electronic signals. Regarding to the corresponding focused image generated by lens 521, it is obstructed by the rotatable light shade 55 so it can not reach the charge coupled device 53. The present invention can still be further diversified. For example, the rotatable light shade 55 may rotate among the position on optical path 562 and the position between the dichroic mirror 541 and the reflective mirror 542. Certainly, the reflective mirror 542 may be substituted by another dichroic mirror.

Figure 5:
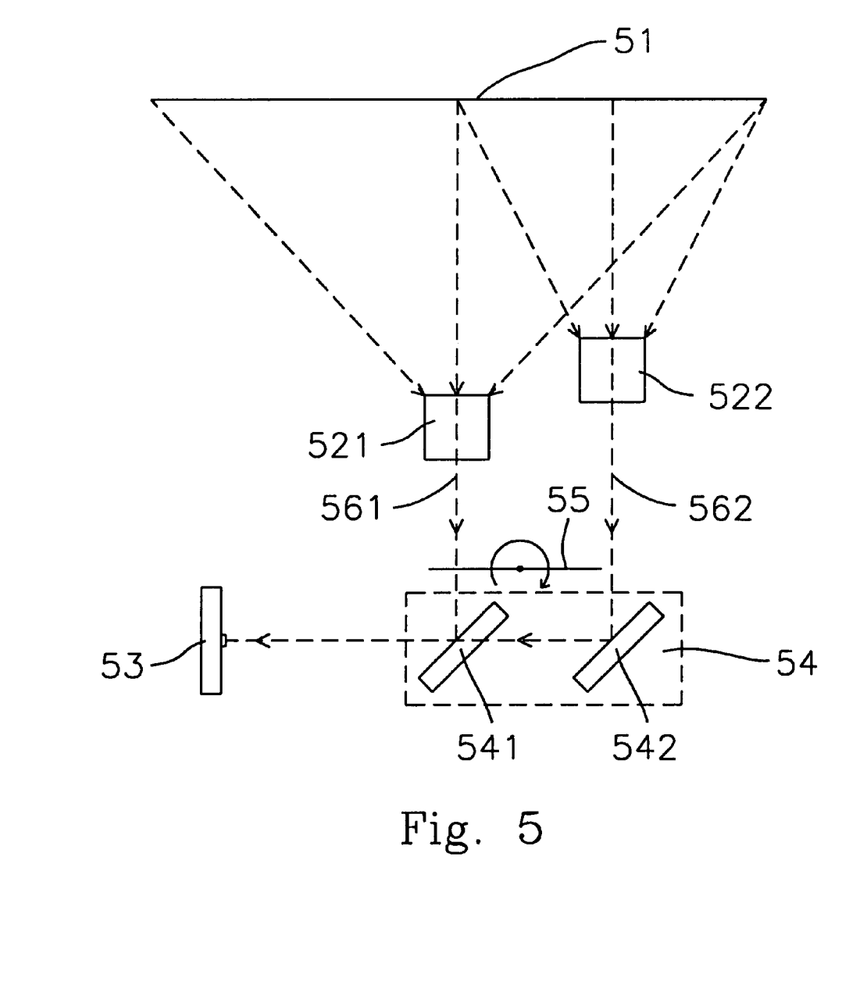
FIG. 5 is a schematic diagram showing a fourth preferred embodiment of a scanner according to the present invention.

The feature of this preferred embodiment is that the optical elements such as lenses, light-reflecting unit, and the charge coupled device are immobily fixed in the housing when the resolution of the scanner changes. The method of the present invention does not take advantage of capturing the desired corresponding focused image, but eliminating undesired corresponding focused images. The rotatable light shade is adopted to shade the charge coupled device from the undesired corresponding focused images. The precision of the scanner according to the present invention keeps unerring because rotating the light shade will not affect the positions of other optical elements. The other driving elements due to precision or additional charge coupled device due to optional resolutions according to the prior arts are not needed so the size and the production cost of the novel scanner are reduced very much. Accordingly, the present invention really conforms to the genius of modern technology.

Figure 6:
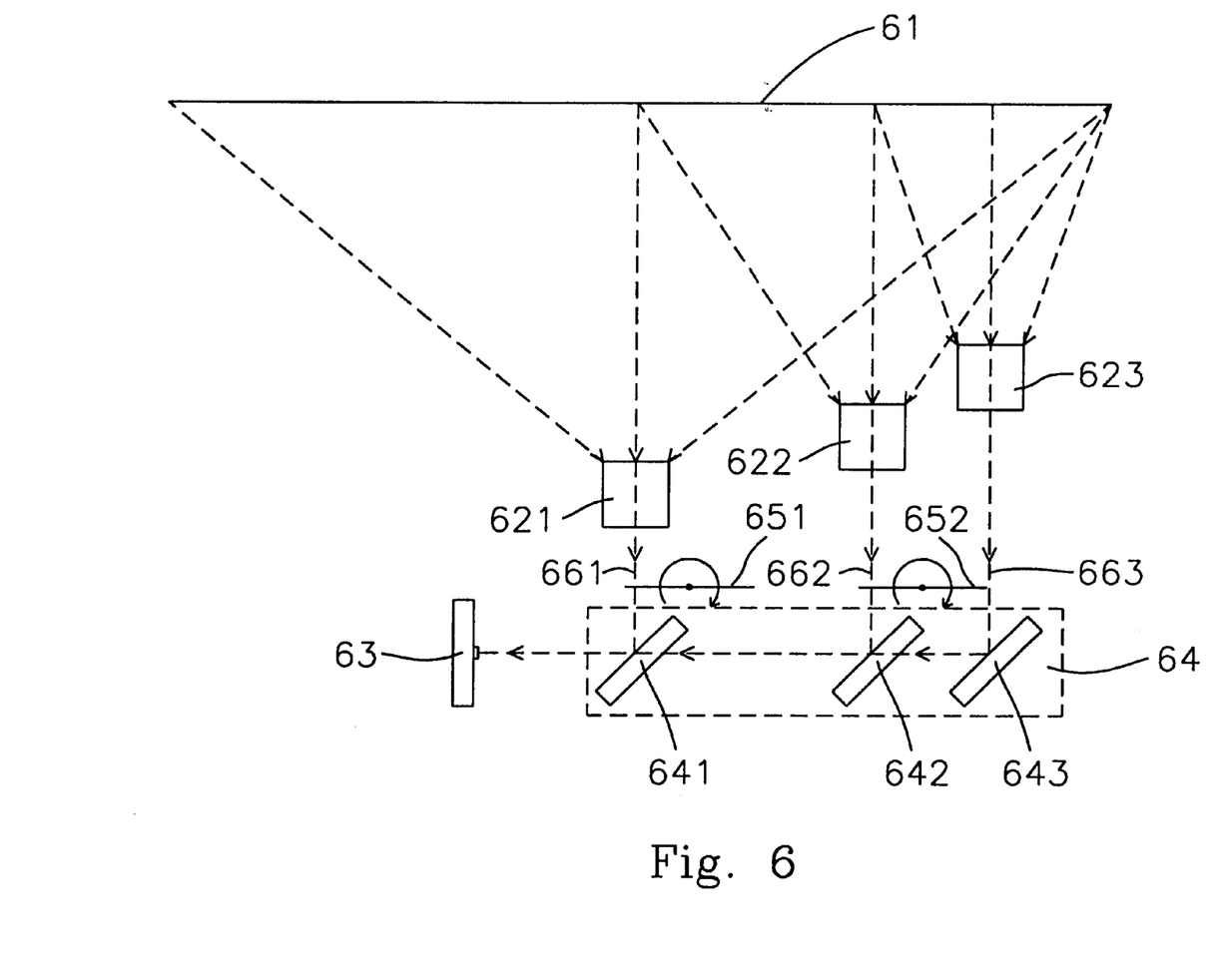
FIG. 6 is a schematic diagram showing a fifth preferred embodiment of a scanner according to the present invention.

The number of focusing units also can be expanded to meet one's requirement. Their working functions are similar to those stated above. Please refer to FIG. 6 which is a schematic diagram showing a fifth preferred embodiment of a scanner having three focusing units according to the present invention. The light-reflecting unit 64 includes two dichroic mirrors 641 and 642 and a reflective mirror 643. The initial image 61 is focused by lenses 621, 622, and 623 so three corresponding focused images are generated; one follows optical path 661, another follows optical path 662, and the other follows optical path 663. When a lower resolution is allowable, the rotatable light shade 651 rotates and is located between the dichroic mirrors 641 and 642 while the other rotatable light shade 652 may be located on optical path 662 or be located between the dichroic mirror 642 and the reflective mirror 643. The corresponding focused image generated by lens 621 is transmitted to the charge coupled device 63 by dichroic mirror 641, and then to be converted into electronic signals by charge coupled device 63. Other corresponding focused images generated by lenses 622 and 623 can not reach the charge coupled device 63 because they are obstructed by the rotatable light shades 651 and 652. Likewise, when a higher resolution is required, the rotatable light shade 651 rotates and is located on optical path 661 while the other rotatable light shade 652 rotates and is located between the dichroic mirror 642 and the reflective mirror 643. The corresponding focused image generated by lens 622 is transmitted to the charge coupled device 63 by dichroic mirror 642 by way of another dichroic mirror 641, and then is converted into electronic signals by charge coupled device 63. Other corresponding focused images generated by lenses 621 and 623 can not reach the charge coupled device 63 because they are obstructed by the rotatable light shades 651 and 652 respectively. By the same token, when the highest resolution is necessary, the rotatable light shades 651 and 652 rotate and are located on optical paths 661 and 662 respectively. The desired corresponding focused image is transmitted to the charge coupled device 63 by reflective mirror 643 by way of dichroic mirrors 642 and 641 in sequence, and then is converted into electronic signals by charge coupled device 63. Regarding to the undesired corresponding focused images, they are obstructed by the rotatable light shades 651 and 652 and can not reach the charge coupled device 63. Certainly, a third dichroic mirror may substitute for the reflective mirror 643.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical device with optional resolutions for converting an initial image into electronic signals by a specific resolution, comprising:

a housing;

a plurality of focusing units with various magnifying powers and various optical path lengths mounted immobily in said housing for variously proportionally receiving said initial image and generating a focused image;

a photoelectric conversion unit mounted immobily in said housing for converting said focused image into said electronic signals;

a light-reflecting unit mounted immobily in said housing and located between said photoelectric conversion unit and said plurality of focusing units for transmitting said focused image to said photoelectric conversion unit; and wherein said optical device additionally includes a selecting unit located upstream of said light-reflecting unit for interrupting optical paths of said plurality of focusing units except a selected one of said focusing units so that only said focused image from said selected focusing unit reaches said photoelectric conversion unit to perform said specific resolution.

2. The optical device according to claim 1 wherein said photoelectric conversion unit is a charge coupled device.

3. The optical device according to claim 1 wherein said light-reflecting unit comprises a plurality of mirrors.

4. The optical device according to claim 1 wherein said selecting unit is a light shade set mounted on optical paths of said plurality of focusing units.

5. The optical device according to claim 4 wherein said light shade set comprises a movable light shade.

6. The optical device according to claim 4 wherein said light shade set comprises a rotatable light shade.

7. The optical device according to claim 1 wherein a total number of said plurality of focusing units is from 2 to 4.

8. The optical device according to claim 7 wherein said plurality of focusing units are a first lens and a second lens, said selected focusing unit being said first lens in a first instance and being said second lens in a second instance respectively.

9. The optical device according to claim 8 wherein said selecting unit comprises a movable light shade positioned on an optical path of said second lens in said first instance, and positioned on an optical path of said first lens in said second instance.

10. The optical device according to claim 8 wherein said selecting unit comprises:

a first movable light shade moved away from an optical path of said first lens in said first instance and positioned on said optical path of said first lens in said second instance; and a second movable light shade positioned on an optical path of said second lens in said first instance and moved away from said optical path of said second lens in said second instance.

11. The optical device according to claim 8 wherein said light-reflecting device comprises:
- a dichroic mirror for transmitting said focused image from said first lens to said photoelectric conversion unit in said first instance; and
- a reflective mirror for transmitting said focused image from said second lens to said photoelectric conversion unit through said dichroic mirror in said second instance.

12. The optical device according to claim 11 wherein said selecting unit comprises a rotatable light shade rotated to be positioned between said dichroic mirror and said reflective mirror in said first instance, and to be positioned between said first lens and said dichroic mirror in said second instance.

13. The optical device according to claim 8 wherein said light-reflecting device comprises:
- a first dichroic mirror for transmitting said focused image from said first lens to said photoelectric conversion unit in said first instance; and
- a second dichroic mirror for transmitting said focused image from said second lens to said photoelectric conversion unit through said first dichroic mirror in said second instance.

14. The optical device according to claim 13 wherein said selecting unit comprises a rotatable light shade rotated to be positioned between said first dichroic mirror and said second dichroic mirror in said first instance, and to be positioned between said first lens and said first dichroic mirror in said second instance.

15. The optical device according to claim 7 wherein said plurality of focusing units are a first lens, a second lens, and a third lens, said selected focusing unit being said first lens in a first instance, being said second lens in a second instance, and being said third lens in a third instance respectively.

16. The optical device according to claim 15 wherein said selecting unit comprises:
- a first movable light shade moved away from an optical path of said first lens in said first instance, and positioned on said optical path of said first lens in said second instance and said third instance;
- a second movable light shade moved away from an optical path of said second lens in said second instance, and positioned on said optical path of said second lens in said first instance and said third instance; and
- a third movable light shade moved away from an optical path of said third lens in said third instance, and positioned on said optical path of said third lens in said first instance and said second instance.

17. The optical device according to claim 15 wherein said light-reflecting device comprises:
- a first dichroic mirror for transmitting said focused image from said first lens to said photoelectric conversion unit in said first instance;
- a second dichroic mirror for transmitting said focused image from said second lens to said photoelectric conversion unit through said first dichroic mirror in said second instance; and
- a reflective mirror for transmitting said focused image from said third lens to said photoelectric conversion unit through said first dichroic mirror and said second dichroic mirror in said third instance.

18. The optical device according to claim 17 wherein said selecting unit comprises:
- a first rotatable light shade rotated to be positioned between said first dichroic mirror and said second dichroic mirror in said first instance, and to be positioned between said first lens and said first dichroic mirror in said second instance and said third instance; and
- a second rotatable light shade rotated to be positioned between said second dichroic mirror and said reflective mirror in said second instance, and to be positioned between said second lens and said second dichroic mirror in said third instance.

19. The optical device according to claim 15 wherein said light-reflecting device comprises:
- a first dichroic mirror for transmitting said focused image from said first lens to said photoelectric conversion unit in said first instance;
- a second dichroic mirror for transmitting said focused image from said second lens to said photoelectric conversion unit through said first dichroic mirror in said second instance; and
- a third dichroic mirror for transmitting said focused image from said third lens to said photoelectric conversion unit through said first dichroic mirror and said second dichroic mirror in said third instance.

20. The optical device according to claim 19 wherein said selecting unit comprises:
- a first rotatable light shade rotated to be positioned between said first dichroic mirror and said second dichroic mirror in said first instance, and to be positioned between said first lens and said first dichroic mirror in said second instance and said third instance; and
- a second rotatable light shade rotated to be positioned between said second dichroic mirror and said third dichroic mirror in said second instance, and to be positioned between said second lens and said second dichroic mirror in said third instance.

* * * * *